United States Patent
Ruthardt et al.

(10) Patent No.: US 7,066,410 B2
(45) Date of Patent: Jun. 27, 2006

(54) COMMON RAIL INJECTOR

(75) Inventors: Siegfried Ruthardt, Altdorf (DE);
Juergen Hanneke, Stuttgart (DE);
Holger Rapp, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/019,268

(22) PCT Filed: Apr. 10, 2001

(86) PCT No.: PCT/DE01/01406

§ 371 (c)(1),
(2), (4) Date: Mar. 12, 2002

(87) PCT Pub. No.: WO01/83978

PCT Pub. Date: Nov. 8, 2001

(65) Prior Publication Data

US 2003/0102452 A1 Jun. 5, 2003

(30) Foreign Application Priority Data

Apr. 28, 2000 (DE) ......................... 100 20 870

(51) Int. Cl.
*F02M 61/10* (2006.01)
*F02M 39/00* (2006.01)
*B05B 1/30* (2006.01)

(52) U.S. Cl. .............. 239/533.11; 239/533.2; 239/533.3; 239/585.1; 239/585.5; 239/585.3

(58) Field of Classification Search .......... 239/533.2, 239/533.3, 533.8, 533.9, 533.11, 585.1, 585.3, 239/585.4, 585.5, 88, 89, 91, 92; 251/129.15, 251/129.21
See application file for complete search history.

(56) References Cited

U.S. PATENT DOCUMENTS

| | | | | |
|---|---|---|---|---|
| 4,230,273 A | * | 10/1980 | Claxton et al. | 239/125 |
| 4,909,440 A | * | 3/1990 | Mitsuyasu et al. | 239/96 |
| 5,114,077 A | * | 5/1992 | Cerny | 239/483 |
| 5,342,066 A | * | 8/1994 | Henley et al. | 277/329 |
| 5,544,816 A | * | 8/1996 | Nally et al. | 239/585.5 |
| 5,553,790 A | * | 9/1996 | Findler et al. | 239/585.1 |
| 5,775,600 A | * | 7/1998 | Wildeson et al. | 239/585.4 |

* cited by examiner

Primary Examiner—Davis Hwu
(74) Attorney, Agent, or Firm—Ronald E. Greigg

(57) ABSTRACT

The invention relates to a common rail injector for injecting fuel in a common rail injection system of an internal combustion engine, having an injector housing, which communicates with a central high-pressure reservoir and in which a nozzle needle is axially displaceable in order to adjust the injection as a function of the pressure in a control chamber, and having a sealing element, which is disposed in an annular chamber that is provided between a valve element and the injector housing. In addition to the sealing element, a support device is disposed in the annular chamber between the valve element and the injector housing.

15 Claims, 2 Drawing Sheets

COMMON RAIL INJECTOR

CROSS-REFERENCE TO RELATED APPLICATIONS

This application is a 35 USC 371 application of PCT/DE 01/01 406 filed on Apr. 10, 2001.

BACKGROUND OF THE INVENTION

1. Field of the Invention

The invention relates to a common rail injector for injecting fuel in a common rail injection system of an internal combustion engine, having an injector housing, which communicates with a central high-pressure reservoir and in which a nozzle needle is axially displaceable in order to adjust the injection as a function of the pressure in a control chamber, and having a sealing element, which is disposed in an annular chamber that is provided between a valve element and the injector housing.

2. Description of the Prior Art

In common rail injection systems, a high-pressure pump pumps the fuel into the central high-pressure reservoir, which is known as a common rail. From the high-pressure reservoir, high-pressure lines lead to the individual injectors, which are assigned to the engine cylinders. The injectors are triggered individually, each via a respective control valve, by the engine electronics. When the control valve opens, fuel subjected to high pressure moves past the nozzle needle, which is raised counter to the prestressing force of a closing spring, into the combustion chamber.

In conventional injectors, of the kind described for instance in European Patent Disclosure EP 0 604 915 B1, a soft sealing ring is used as the sealing element.

The object of the invention is to lengthen the service life of the known injectors by simple means. Nevertheless, despite a longer service life, the injector of the invention should be capable of being produced economically.

In a common rail injector for injecting fuel in a common rail injection system of an internal combustion engine, having an injector housing, which communicates with a central high-pressure reservoir and in which a nozzle needle is axially displaceable in order to adjust the injection as a function of the pressure in a control chamber, and having a sealing element, which is disposed in an annular chamber that is provided between a valve element and the injector housing, this object is attained in that in addition to the sealing element, a support device is disposed in the annular chamber between the valve element and the injector housing.

SUMMARY OF THE INVENTION

In experiments performed in the context of the present invention, it has been demonstrated that the soft sealing ring is pressed into the gap between the valve element and the injector housing by the rail pressure that prevails permanently in the annular chamber. At extremely high pressures, it has even happened that the soft sealing ring was flushed through the gap between the valve element and the injector housing. Such flushing of the sealing element through the gap is reliably prevented by the support device of the invention. Even at extreme pressures, a long service life of the injector of the invention is thus assured.

A particular embodiment of the invention is characterized in that the support device is formed by an annular support disk, in particular comprising a metal material. The inner circumference of the support disk, in the installed state, rests on the valve element and closes the gap between the valve element and the injector housing.

A further particular embodiment of the invention is characterized in that the support disk is embodied as slightly conical on its inner circumference. By its conical embodiment, the support disk is given a spring action, which has proved advantageous at extreme pressures, especially upon load changes. Upon an axial pressure stress, the support disk stretches elastically in the radial direction and tightly closes the gap between the valve element and the injector housing.

A further particular embodiment of the invention is characterized in that the slightly conically embodied inner circumference of the support disk narrows toward the sealing element or away from the sealing element. In practice it has been found that the advantageous effects of the support disk of the invention occur not only when the inner circumference of the support disk tapers toward the sealing element but also if the inner circumference of the support disk tapers away from the sealing element. This aspect of the invention could not have been expected, without recognition of the significance of the spring action of the support disk.

A further particular embodiment of the invention is characterized in that the support disk is embodied slightly conically on its inner and outer circumference. By the embodiment of the support disk as a double cone in cross section, the support disk is given a stronger spring action. The double cone can be mounted with its tip pointing toward or away from the sealing element.

A further particular embodiment of the invention is characterized in that leakage grooves are embodied in the support device. By means of the leakage grooves, an intentional leak between the support device and the injector housing is brought about. As a result, slight leakage flows that pass through the sealing element can be removed. This offers the advantage that a pressure cushion cannot build up between the sealing element and the support device. Such a pressure cushion could in fact cause the sealing element to shift undesirably in the axial direction.

A further particular embodiment of the invention is characterized in that the leakage grooves are provided on the side of the support device remote from the sealing element. This prevents the sealing element from being pressed into the leakage grooves during operation and thereby closing the leakage grooves.

BRIEF DESCRIPTION OF THE DRAWINGS

Further advantages, characteristics and details of the invention will become apparent from the ensuing description, in which various exemplary embodiments of the invention are described in detail in conjunction with the drawing, in which.

DESCRIPTION OF THE PREFERRED EMBODIMENTS

Figure 1:
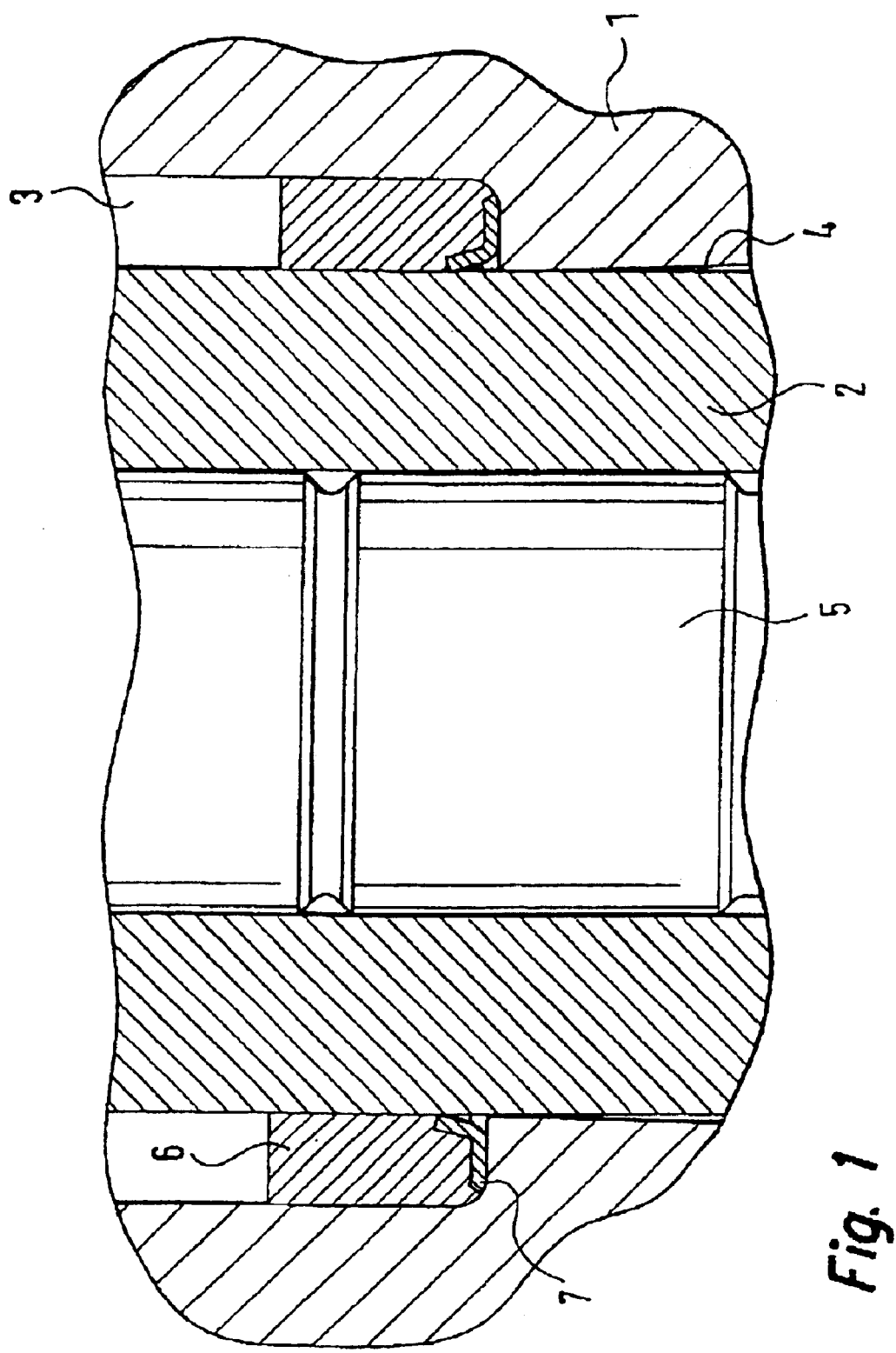
FIG. 1 is a fragmentary elevation view of a longitudinal section through an injector of the invention, with a built-in support disk.

In FIG. 1, a fragment of an injector of the invention is shown in longitudinal section. A complete longitudinal section through such an injector is shown in FIG. 1 of EP 0 604 915 B1, reference to which may be had for a fuller illustration of the environment of the invention. The injector serves to inject fuel, which is subjected to high pressure, into the combustion chamber if an internal combustion engine (not shown).

A valve element 2 is received in an injector housing 1. An annular chamber 3 is formed between the valve element 2 and the injector housing 1. A gap 4 is formed, dictated by production considerations, on the end of the annular chamber 3 toward the combustion chamber (the lower end, in FIG. 1). The annular chamber 3 is also called a valve antechamber and is disposed upstream of the inlet to the control chamber. The annular chamber 3 is always subjected to the full rail pressure.

A control rod 5 is received axially displaceably in the interior of the valve element 2. The control rod 5 serves to control the opening and closing motion of the injector of the invention.

To close the gap 4 between the valve element 2 and the injector housing 1 so that it is proof against high pressure, a soft sealing ring 6 of rectangular cross section is received in the annular chamber 3. The end face, toward the gap 4, of the soft sealing ring 6 rests on a support disk 7. The support disk 7 is made of sheet metal or plastic. The support disk 7 is bent upward at its inner circumference and rests on the valve element 2. In this way, when fuel subjected to high pressure is located in the annular chamber 3, the soft sealing ring 6 is prevented from being pressed into the gap 4.

The soft sealing ring 6 and the support disk 7 can be preassembled and then installed together into the injector of the invention. The support disk 7 has a thickness of several tenths of a millimeter and is drawn out slightly conically. The cone formed on the inner circumference has a very obtuse cone angle.

Figure 2:
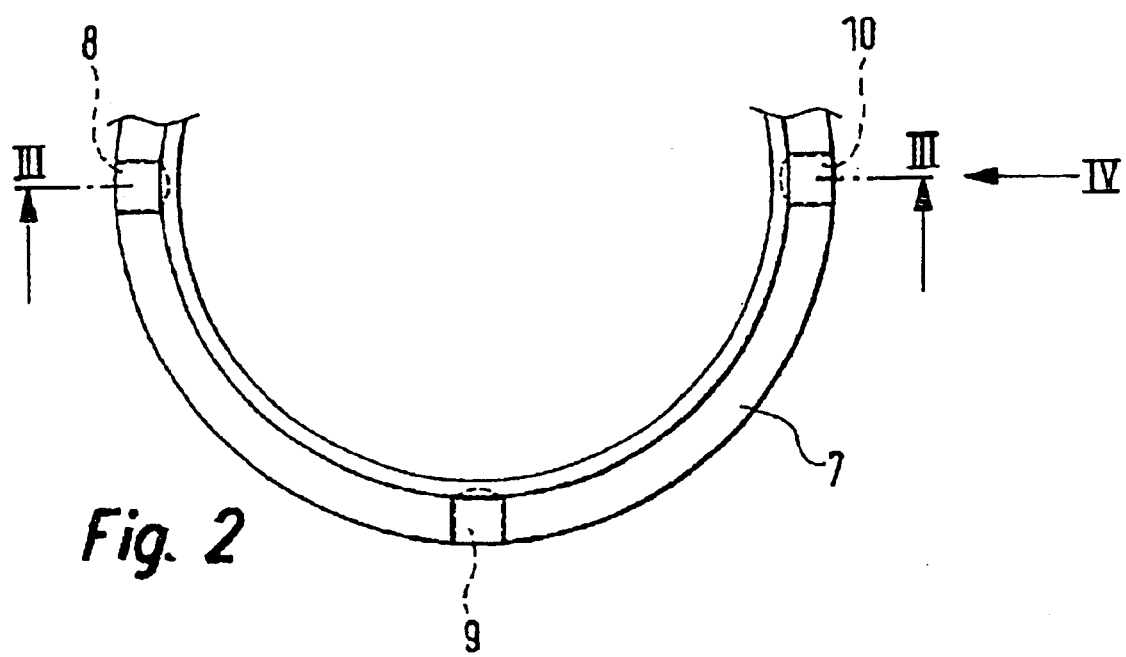
FIG. 2 is a plan view of a support disk with leakage grooves.
Figure 3:
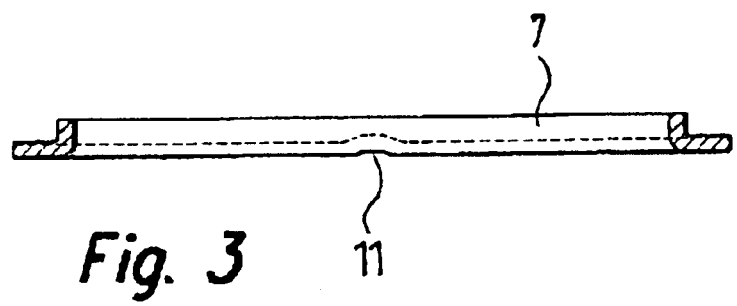
FIG. 3 is a sectional view taken along the line III—III in FIG. 2.
Figure 4:
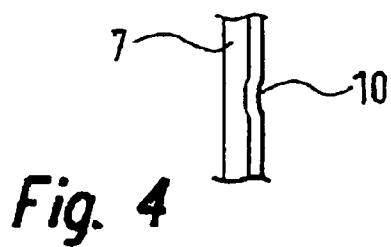
FIG. 4 is an elevation view taken in the direction of arrow IV in FIG. 2.

A further embodiment of a support disk of the invention is shown alone in FIGS. 2–4. In the plan view shown in FIG. 2, dashed lines indicate that a plurality of leakage grooves 8, 9 and 10 are embodied in the lower side of the support disk 7. In the sectional view shown in FIG. 3, it can be seen that the groove bottom of a leakage groove 11 is spaced apart only slightly from the underside of the support disk 7.

By means of the leakage grooves 8, 9, 10 and 11 made in the underside of the support disk 7, an intentional leak is brought about between the support disk 7 and the injector housing 1. Alternatively, it is also possible to make corresponding leakage grooves in the surface of the injector housing or of the valve element 2 toward the support disk 7. By means of the leakage grooves, it is assured that slight leakage flows, which pass through the soft sealing ring 6, can be removed toward the bottom.

The foregoing relates to preferred exemplary embodiment of the invention, it being understood that other variants and embodiments thereof are possible within the spirit and scope of the invention, the latter being defined by the appended claims.

What is claimed is:

1. A common rail injector for injecting fuel in a common rail injection system of an internal combustion engine, comprising an injector housing (1), which communicates with a central high-pressure reservoir and in which a nozzle needle is axially displaceable in order to adjust the injection as a function of the pressure in a control chamber, and an annular sealing ring (6), which is disposed in an annular chamber (3) that is provided between a valve element (2) and the injector housing (1), and in addition to the sealing ring (6), a continuous annular support disc (7) is disposed in the annular chamber (3) between the valve element (2) and the injector housing (1), the support disc (7) engaging and supporting the sealing ring and engaging the valve element around its inner circumference.

2. The common rail injector of claim 1, wherein the annular support disk (7) comprises a metal material.

3. The common rail injector of claim 2, wherein the support disk (7) is embodied as slightly conical on its inner circumference.

4. The common rail injector of claim 3, wherein the slightly conically embodied inner circumference of the support disk (7) narrows toward the sealing element (6) or away from the sealing element (6).

5. The common rail injector of claim 1, wherein the support disk (7) is embodied slightly conically on its inner and outer circumference.

6. A common rail injector for injecting fuel in a common rail injection system of an internal combustion engine, comprising an injector housing (1), which communicates with a central high-pressure reservoir and in which a nozzle needle is axially displaceable in order to adjust the injection as a function of the pressure in a control chamber, and a sealing element (6), which is disposed in an annular chamber (3) that is provided between a valve element (2) and the injector housing (1), an annular support device (7) disposed in the annular chamber (3) between the valve element (2) and the injector housing (1) and engaging the sealing element, and leakage grooves (8, 9, 10, 11) embodied in the annular support device.

7. The common rail injector of claim 6, where the annular support disc is formed of a metal material.

8. The common rail injector of claim 7, wherein the the leakage grooves (8, 9, 10, 11) are provided on the side of the support device (7) remote from the sealing element (6).

9. The common rail injector of claim 6, wherein the support device (7) comprises an annular disc which is slightly conical on its inner circumference, and wherein leakage grooves (8, 9, 10, 11) are embodied in the support disc (7).

10. The common rail injector of claim 9, wherein the leakage grooves (8, 9, 10, 11) are provided on the side of the support device (7) remote from the sealing element (6).

11. The common rail injector of claim 6, wherein leakage grooves (8, 9, 10, 11) are embodied in the support device (7), and wherein the slightly conically embodied inner circumference of the support disk (7) narrows toward the sealing element (6) or away from the sealing element (6).

12. The common rail injector of claim 11, wherein the leakage grooves (8, 9, 10, 11) are provided on the side of the support device (7) remote from the sealing element (6).

13. The common rail injector of claim 6, wherein the leakage grooves (8, 9, 10, 11) are embodied in the support device (7), and wherein the support disk (7) is embodied slightly conically on its inner and outer circumference.

14. The common rail injector of claim 13, wherein the leakage grooves (8, 9, 10, 11) are provided on the side of the support device (7) remote from the sealing element (6).

15. The common rail injector of claim 6, wherein the leakage grooves (8, 9, 10, 11) are provided on the side of the support device (7) remote from the sealing element (6).

\* \* \* \* \*